April 6, 1943.        E. E. STAHLY        2,316,026
REFINING PROCESS
Filed Jan. 25, 1940
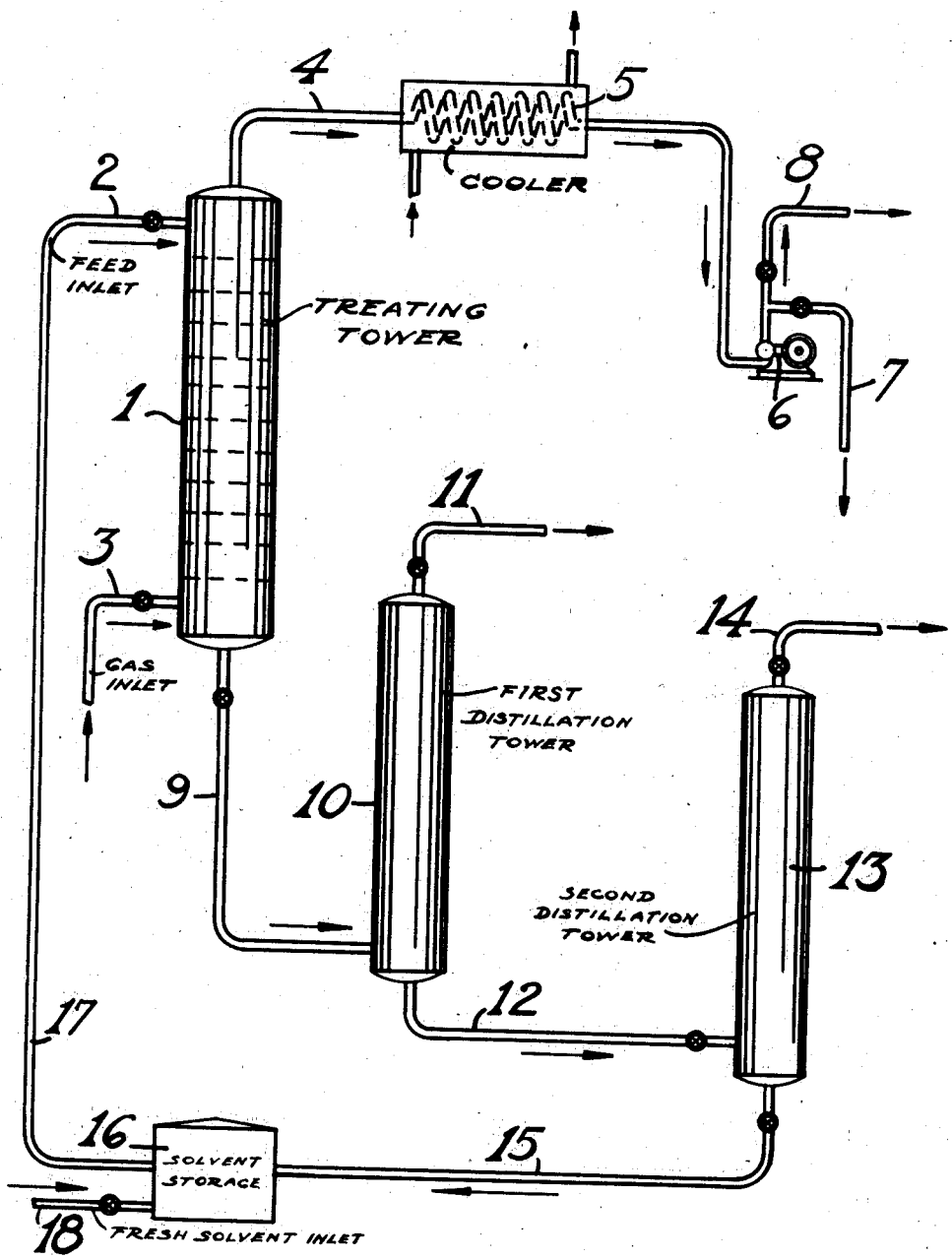
Eldon E. Stahly Inventor
By P. L. Young Attorney Patented Apr. 6, 1943

2,316,026

UNITED STATES PATENT OFFICE 2,316,026

REFINING PROCESS

Eldon E. Stahly, Baton Rouge, La., assignor, by mesne assignments, to Jasco, Incorporated, a corporation of Louisiana Application January 25, 1940, Serial No. 315,495

8 Claims. (Cl. 183—115)

The present invention relates to the refining of mineral oils. The invention is particularly directed to a method of refining gases derived in the processing of petroleum oils by which it is possible to economically segregate the gases into their respective constituents which are generally utilized as intermediate agents for the production of additional valuable products. In accordance with the present process, unsaturated hydrocarbon gases are segregated from saturated hydrocarbon gases by treating gaseous mixtures containing the same, preferably in a countercurrent manner, with a liquid solution of a high molecular weight substance secured by the polymerization of relatively low molecular weight hydrocarbons.

In the processing of mineral oils, particularly petroleum oils, it is very desirable in many instances to segregate various gaseous by-products and to use these fractions as intermediate feed stocks for the production of additional valuable products. For example, it is desirable to segregate gases secured in the refining of petroleum oils into fractions having a relatively high concentration of unsaturated constituents in order to secure a suitable feed stock for various polymerization and alkylation operations. This is necessary since in many cases the process could not otherwise be economically justified. Thus, various methods have been suggested for the segregation of unsaturated hydrocarbons from gaseous mixtures containing the same. A common practice is to employ various solvents which exhibit a preferential selectivity for either the saturated or unsaturated constituents and then to subsequently recover the dissolved material. I have now discovered a process employing a particular solvent by which it is possible to economically and efficiently produce gas fractions containing a relatively high concentration of olefins from gas mixtures containing the same. The process of my invention comprises absorbing the unsaturated constituents from gaseous mixtures containing the same, utilizing as a selective solvent a solution of a solid high molecular weight substance secured by polymerizing a relatively low molecular weight hydrocarbon. The process of my invention is preferably a continuous one. It is also desirable that the absorbed hydrocarbons be recovered from the solvent in a two-stage distillation operation.

The process of my invention may be readily understood by reference to the attached drawing illustrating one modification of the same. The selective solvent, for the purposes of illustration, is taken to be a pentane solution of a high molecular weight substance secured by polymerizing butene under conditions to produce a polymerized product having a molecular weight in the range above about 30,000. The solvent solution is introduced into the top of countercurrent treating tower 1 by means of feed line 2. The solvent solution flows downwardly through tower 1 and contacts upflowing gases which are introduced into tower 1 by means of feed line 3. Adequate contact between the countercurrently flowing phases is secured by suitable distributing and contacting means such as bubble cap plates, pierced plates, contact masses, and the like. Temperature and pressure conditions are maintained on tower 1 adapted to secure a maximum absorption of the unsaturated hydrocarbons. The treated gas mixture is withdrawn from tower 1 by means of line 4 and handled in any manner desirable. These gases may be cooled in cooler 5, compressed in compressor 6, and returned to the system by means of line 7 or removed by means of line 8 and disposed of in any manner desirable. The solvent solution containing the dissolved unsaturated hydrocarbons is removed from the bottom of tower 1 by means of line 9 and handled in a manner to recover the dissolved hydrocarbons from the solvent solution. This may be accomplished in any desirable manner. However, in accordance with my invention, the preferred method is to utilize a two-stage distillation operation. This is accomplished by introducing the solution removed from tower 1 by means of line 9 into initial distillation stage 10. Temperature and pressure conditions are adjusted so that a relatively small per cent of the gases dissolved is removed overhead from distillation unit 10 by means of line 11. I have found that these gases are relatively rich in saturated hydrocarbons. The solution is removed from distillation unit 10 by means of line 12 and introduced into the secondary distillation unit 13. Temperature and pressure conditions are adjusted in distillation unit 13 adapted to substantially completely recover the dissolved gases which are removed overhead by means of line 14. The solvent solution is removed from distillation unit 13 by means of line 15 and passed to solvent storage 16, from which it may be recycled to tower 1 by means of line 17. Fresh solvent may be introduced by means of line 18.

The solvent mixture of my invention comprises a solution of high molecular weight substances secured by the polymerization of relatively low molecular weight hydrocarbons. Preferred solvents are solutions of substantially saturated high molecular weight hydrocarbon polymers having molecular weights in the range from about 1,000 to 300,000, preferably in the range of above 30,000. These polymers are characterized by having a relatively long hydrocarbon chain, the carbon atoms of which are all completely saturated with the exception of a single double bond or relatively few double bonds. The molecular weights of the solid solvents of the present invention are determined by the method described in Staudinger's book, "Die Hockmolekularen Organischem Verbindungen," H. Staudinger Berlin 1932 Verlag Von Juluis Stringer, page 56. The solvent polymer compounds of the present invention are prepared by polymerizing substituted unsymmetrical alpha olefins, especially iso-mono-olefin hydrocarbons, as for example, isobutylene, isoamylene, and the like at low temperatures in the presence of an inorganic halide catalyst. The temperature of polymerization is preferably below 0° C., preferably in the range below —30° C. or even lower, depending upon the particular catalyst or other reaction conditions employed. As a catalyst, boron fluoride has been found particularly satisfactory. Also, boron fluoride mixed with hydrogen fluoride may be used, as well as phosphorous or antimony trifluoride or pentafluoride and aluminum chloride, the latter preferably being in the radiant state as obtained when aluminum is acted upon by hydrogen chloride. In the case of aluminum chloride 3% to 5% of the catalyst may be used, whereas in the case of the previously mentioned boron fluoride catalyst 1% or so may be sufficient. Also, solutions or double compounds of said halides such as with phenol, cresol, and the like may be used. In the polymerization operation, suitable diluents may be used, preferably a volatile material such as pentane or a commercial naphtha which can be readily driven off, if desired, after completion of the polymerization. Inasmuch as such polymerizations are usually exothermic, it is generally desirable to provide some means of cooling the reaction chamber, either externally or internally, as by the use of cooling coils or by the evaporation of a liquefied gas such as propane, etc. The molecular weight is readily controlled by regulating the temperature and duration of the polymerization operation. In general, the higher the molecular weight the less sticky and tougher and harder is the polymer.

As a particular example of a preferred method of preparing such a polymer, isobutylene is polymerized at a temperature of about —10° C. by bubbling boron fluoride gas through a solution of isobutylene dissolved in liquefied propane. When the molecular weight reaches about 10,000 or 15,000 the reaction is stopped and any catalyst remaining dissolved or suspended in the liquid is removed by washing the reaction product with water or dilute caustic soda. The volatile solvent is then removed by distillation, leaving a colorless plastic polymer as residue. This polymer is somewhat tacky and plastic, is soluble in hydrocarbon solvents and mineral oils, is insoluble in water, is quite resistant to oxidation, and does not harden substantially with age as do some materials which have a fairly high content of unsaturated linkages. My polymer solvents have iodine numbers in the range below about fifteen, often as low as three or five or lower. When freed of unsaturated low molecular weight impurities by known methods, their iodine numbers generally do not exceed a value of five as determined by the Hanus method. For example, a polyisobutylene product having an average molecular weight of about 13,000, comprising substantially no constituents having molecular weights below about 10,000 and which was purified by precipitation from a solution with dioxan, had an iodine number of 4.7 (cgs. I/gm.). Another polyisobutylene product having an average molecular weight of about 70,000 and comprising substantially no constituents having molecular weights below about 40,000 and which was purified by precipitation from a solution with liquid ethylene, had an iodine number of 1.6. As the polymerization reaction proceeds, the degree of unsaturation is gradually reduced.

A satisfactory solvent for the present invention comprises a solution of a co-polymer product. These co-polymers may be produced by polymerizing a mixture of iso-mono-olefin hydrocarbons, as for example, isobutylene and a diolefin product, preferably a conjugated diolefin, as for example, butadiene, isoprene, dimethyl butadiene, and the like. These co-polymer products are similarly prepared at relatively low temperatures, using Friedel-Crafts and similar catalysts. These polymer products may be dissolved in any suitable solvent. Preferred solvents are relatively light petroleum oils, as for example, petroleum oils boiling in the motor fuel and kerosene boiling range. Other desirable solvents are relatively pure hydrocarbons or mixtures of relatively pure hydrocarbons, as for example, isopentane, isobutane, isohexane, and the like. The amount of polymerized product dissolved in the solvent will depend upon the particular polymerized material used, the particular solvent employed, as well as upon the character of the feed gases, operating conditions and upon the yields desired. In general, when utilizing a polymerized product having a molecular weight in the range above 30,000 and utilizing a hydrocarbon solvent boiling in the motor fuel and kerosene boiling range, it is preferred to use from 1% to 25%, preferably from 5% to 10% solution.

The volume of solvent solution used per volume of gases being treated will likewise vary within wide limits and will be a function, to some extent, of the particular solvent used, the solution concentration, and the character of the feed gases. In general, the quantity of treating solution is from one volume to ten volumes of solution per volume of bases being treated. The distillation conditions for the first distillation stage are adapted to remove approximately 20% to 40% and generally not over about 50% of the dissolved constituents from the solvent solution. These conditions, depending upon general operating conditions, will vary considerably. For example, when employing a 5% to 10% solution of isopentane for the production of concentrated butene fractions, the distillation temperature in the initial stage is in the range from about 75° F. to 125° F., provided atmospheric pressure is employed. The second distillation stage is conducted under conditions adapted to produce a solvent solution substantially free of dissolved constituents.

In order to further illustrate the invention, the following example is given which should not be construed as limiting the same in any manner whatsoever:

EXAMPLE

A gaseous feed mixture of butanes and butenes was countercurrently extracted with isopentane solutions of polymer products having molecular weights in the range above about 30,000. These polymer products were produced by polymerizing butenes as described. The dissolved hydrocarbons were recovered from the treating solution in a two-stage distillation operation. The results of these experiments were as follows:

Table 1

|  | Experiment I | Experiment II |
|---|---|---|
| Solvent solution, percent of high molecular weight polymer | 5 | 10 |
| Distillation temperature first stage °F. | 80 | 80 |
| Per cent unsaturates: |  |  |
| Feed gases | 80.0 | 83.0 |
| Gases removed from second distillation | 95.9 | 96.5 |
| Increase | 15.9 | 13.5 |

From the above it is apparent that the present process is particularly adapted for producing gas fractions having a relatively high concentration of unsaturates. Additional stages may be employed to produce substantially pure unsaturated fractions. Recycling of various fractions or the use of diluents and the like may also be utilized to improve the efficiency of the operation.

The process of the present invention is not to be limited by any theory or mode of operation, but only in and by the following claims in which it is desired to claim all novelty in so far as the prior art will permit.

I claim:

1. Process for the production of gas fractions having a relatively high concentration of unsaturated constituents from feed gas mixtures containing the same, comprising treating said feed gas mixtures, with a solvent solution of a high molecular weight substantially saturated polymer product produced by polymerizing relatively low molecular weight olefinic hydrocarbons, under conditions to selectively dissolve the unsaturated constituents, separating the solvent solution and recovering the unsaturated constituents therefrom.

2. Process in accordance with claim 1 in which said polymer product is produced by polymerizing butenes.

3. Process in accordance with claim 1 in which said polymer product has a molecular weight in excess of about 30,000 and which is produced by polymerizing isobutenes.

4. Process in accordance with claim 1 in which said solvent solution comprises a light petroleum oil having dissolved therein from 5% to 20% of a polymer product having a molecular weight in excess of about 30,000, said polymer product being produced by polymerizing isobutenes.

5. Process for the production of gas fractions having a high concentration of unsaturated constituents from feed gas mixtures containing the same, comprising countercurrently treating said feed gas mixtures in a countercurrent tower, with a solvent solution which comprises a high molecular weight substantially saturated polymer product produced by polymerizing relatively low molecular weight olefinic hydrocarbons, under conditions to selectively dissolve the unsaturated hydrocarbon constituents, removing treated gases from the top of said tower, removing the treating solution containing the dissolved hydrocarbon constituents from the bottom of said tower, subjecting the same in an initial distillation stage to conditions adapted to remove a minor amount of the dissolved hydrocarbons, removing the treating solution from said initial distillation stage and subjecting the same in a secondary distillation stage to conditions adapted to substantially completely remove dissolved hydrocarbons from said treating solution whereby a gas fraction relatively rich in unsaturated constituents is evolved, removing said treating solution from the bottom of said secondary stage and recycling the same to said countercurrent treating tower, removing said gas fraction from the top of said secondary distillation stage and recovering the same.

6. Process in accordance with claim 5 in which said high molecular weight substantially saturated polymer product has a molecular weight in excess of about 30,000.

7. Process in accordance with claim 5 in which said solvent solution comprises a light hydrocarbon solution of from 5% to 20% of a high molecular weight substance produced by polymerizing isobutylene.

8. Process in accordance with claim 5 in which from 20% to 40% of the dissolved gases is removed in said initial distillation stage.

ELDON E. STAHLY.